(No Model.) 8 Sheets—Sheet 1.

S. B. ELLITHORP.
LASTING MACHINE.

No. 362,369. Patented May 3, 1887.

Fig. 1.

Witnesses
M. E. Fowler
J. W. Garner

Inventor
Solomon B. Ellithorp
By his Attorneys
C. A. Snow & Co.

(No Model.)  8 Sheets—Sheet 3.

S. B. ELLITHORP.
LASTING MACHINE.

No. 362,369. Patented May 3, 1887.

Witnesses
M. E. Fowler
J. W. Garner

Inventor
Solomon B. Ellithorp
By his Attorneys
C. A. Snow & Co.

(No Model.) 8 Sheets—Sheet 4.
S. B. ELLITHORP.
LASTING MACHINE.

No. 362,369. Patented May 3, 1887.

Witnesses
Inventor
Solomon B Ellithorp,
By his Attorneys
C. A. Snow & Co (No Model.)  8 Sheets—Sheet 4.

S. B. ELLITHORP.
LASTING MACHINE.

No. 362,369.  Patented May 3, 1887.

Witnesses
M. C. Fowler
J. W. Garner

Inventor
Solomon B. Ellithorp,
By his Attorneys
C. A. Snow & Co.

(No Model.) 8 Sheets—Sheet 5.
S. B. ELLITHORP.
LASTING MACHINE.

No. 362,369. Patented May 3, 1887.

(No Model.) 8 Sheets—Sheet 6.
S. B. ELLITHORP.
LASTING MACHINE.

No. 362,369. Patented May 3, 1887.

Witnesses
Inventor
Solomon B. Ellithorp,
By his Attorneys (No Model.) 8 Sheets—Sheet 7.
S. B. ELLITHORP.
LASTING MACHINE.

No. 362,369. Patented May 3, 1887.

Fig. 7.

Witnesses
M. E. Fowler
J. W. Garner

Inventor
Solomon B. Ellithorp,
By his Attorneys
C. A. Snow & Co.

UNITED STATES PATENT OFFICE.

SOLOMON B. ELLITHORP, OF BUFFALO, NEW YORK.

LASTING-MACHINE.

SPECIFICATION forming part of Letters Patent No. 362,369, dated May 3, 1887.

Application filed July 23, 1886. Serial No. 208,873. (No model.)

*To all whom it may concern:*

Be it known that I, SOLOMON B. ELLITHORP, a citizen of the United States, residing at Buffalo, in the county of Erie and State of New York, have invented a new and useful Improvement in Lasting-Machines, of which the following is a specification.

My invention relates to an improvement in lasting-machines; and it consists in the peculiar construction and combination of devices that will be more fully set forth hereinafter, and particularly pointed out in the claims.

This invention is an improvement upon the lasting-machine described in my other application of this date, and the object of this invention is to provide a machine which is adapted to last one boot or shoe while another is being placed upon or taken from the machine, and thus increase the capacity of the machine and correspondingly effect an economy in the manufacture of boots and shoes.

In the accompanying drawings,
Fig. 2 is a vertical longitudinal sectional view of the same.
Fig. 5 is a detailed perspective view of one of the gatherers.
Fig. 9 is a rear view of one of the gatherers.
Fig. 10 is a detail view of one of the plungers.
Fig. 11 is a sectional view of the same.
Fig. 13 is a detailed perspective view of one of the clamping-arms of the gatherers.
Fig. 14 is a sectional view taken on the line $v\ v$ of Fig. 13.
Fig. 15 is a detail sectional view on the line 1 1 of Fig. 5.

A represents a table or bed, which is made substantially in the shape of a pair of diamonds arranged in a longitudinal line and having their inner ends joined together. At each projecting corner of the table or bed is attached a supporting-leg, B, and at the center of the table or bed is attached a seventh supporting-leg, C. The table is thus made double, each end of the same being provided with slots D and E, which intersect each other and extend at right angles, the slots D extending transversely across the ends of the table and the slots E extending longitudinally therein. To the center of the frame is attached a vertical standard, F, to the upper end of which is pivoted the central portion of a swinging bar, G, the said bar corresponding in length to the table or bed and being provided at one extremity with a depending standard, H, which corresponds in height with the standard F, and is thus adapted to rest upon either end of the bed or table, so as to support the swinging bar in a horizontal position. The standard H is made hollow for a considerable distance, and in the said standard is located and secured a coiled extensile spring, I. In the upper portion of the standard H is made a a vertical transverse slot, H', for the purpose to be hereinafter explained.

K represents a pair of longitudinal horizontal shafts, which have their inner ends journaled in the central supporting-leg, C, and their outer portions journaled in the supporting-legs B at the extreme outer end of the table or bed. The said shafts are arranged directly in line with each other, and are provided at their outer ends with hand-wheels or cranks K'; by means of which they may be rotated. Each shaft K is provided at one end with right-hand screw-threads $K^2$, and at the opposite end with left-hand screw-threads $K^3$, the central portions of the said shafts being plane.

L represents collars, which are screwed onto the threaded portions of the shafts, the said collars being provided on opposite sides with grooves or recesses L'.

M represents shafts, which are journaled in the legs B on the sides of the table or bed at the outer ends of the slots D, the said shafts M being directly below the said slots and in line therewith and being arranged at right angles to the shafts K. The shafts M are also provided with the hand-wheels or crank-handles M', and have the right-hand screw-threads $M^2$ and the left-hand screw-threads $M^3$, on which are secured collars N, which are similar to the collars L. The shafts K are provided at their centers with worms O, and the shafts M are provided at their centers with worm-pinions P, which mesh with the worms O. It will thus be seen that when one of the shafts K is rotated the shaft M, which crosses the said shaft K, will be also rotated simultaneously therewith and at the same rate of speed, the diameter of the worm being equal to the diameter of the worm-pinion with which it gears.

Near the inner ends of the slots E are secured standards R by means of clamping-bolts R', and the said standards R are thus made adjustable in the said slots. The standards R carry supporting-pins $R^2$ and toe-rests $R^3$ for the lasts Z. The said supporting-pins and toe-rests are vertically adjustable in the said standards, and are secured at any desired vertical adjustment by means of set-screws $R^4$, with which the standards are provided.

S represents vertical standards, which are provided on their under sides with clamping-bolts S', that extend upwardly through the slots E and are arranged on the outer sides of the standards R. The standards S are provided with outwardly-extending ears, between which are fulcrumed toggle-jointed levers T and T', the levers T extending downwardly and engaging with the sliding collars on the shafts K. From the upper end of the levers T project lever-arms $T^2$. The said levers are identical in construction with those shown in my other application of this date before referred to, and therefore do not need to be more particularly described here.

U represents vertically-adjustable supporting-heads having depending spindles, which are socketed in the standards S. In the said supporting-heads are secured longitudinally-movable sleeves U', which are connected to the upper ends of the levers T', and are thereby adapted to be moved forwardly or rearwardly by the said levers when the shafts K are rotated, as will be very readily understood.

Figures 5, 9, 10, 11, 13, 14, 15:
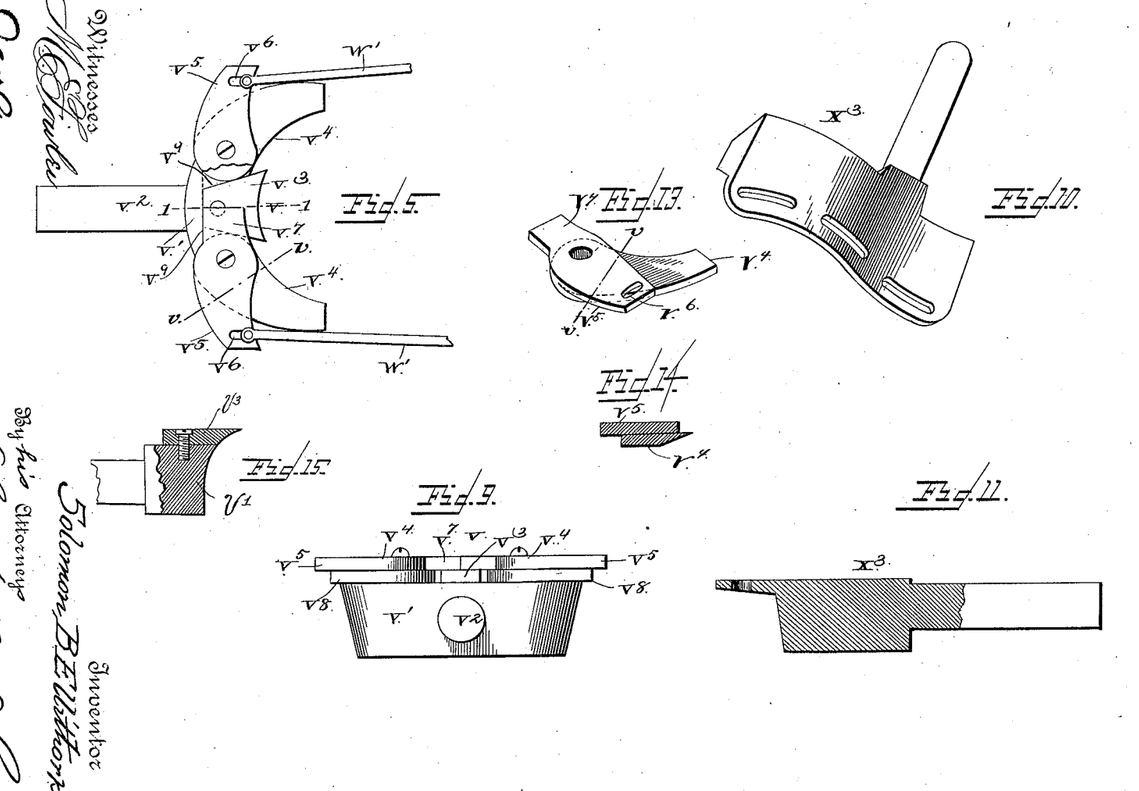
Figure 6:
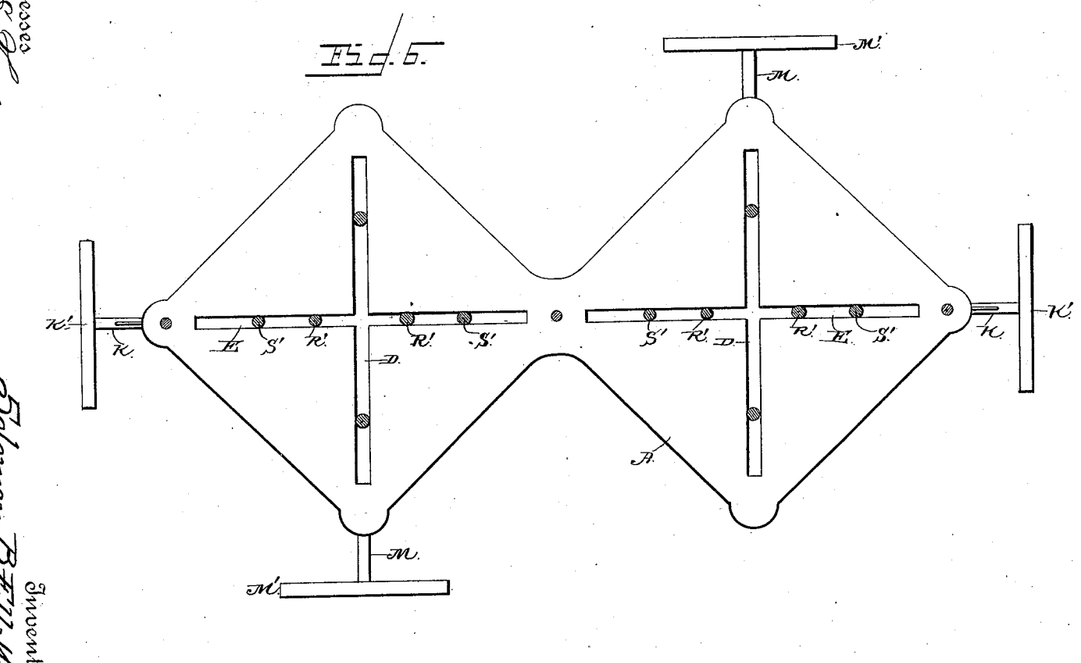
Fig. 6 is a horizontal sectional view on line $z\ z$ of Fig. 1.
Figure 7:
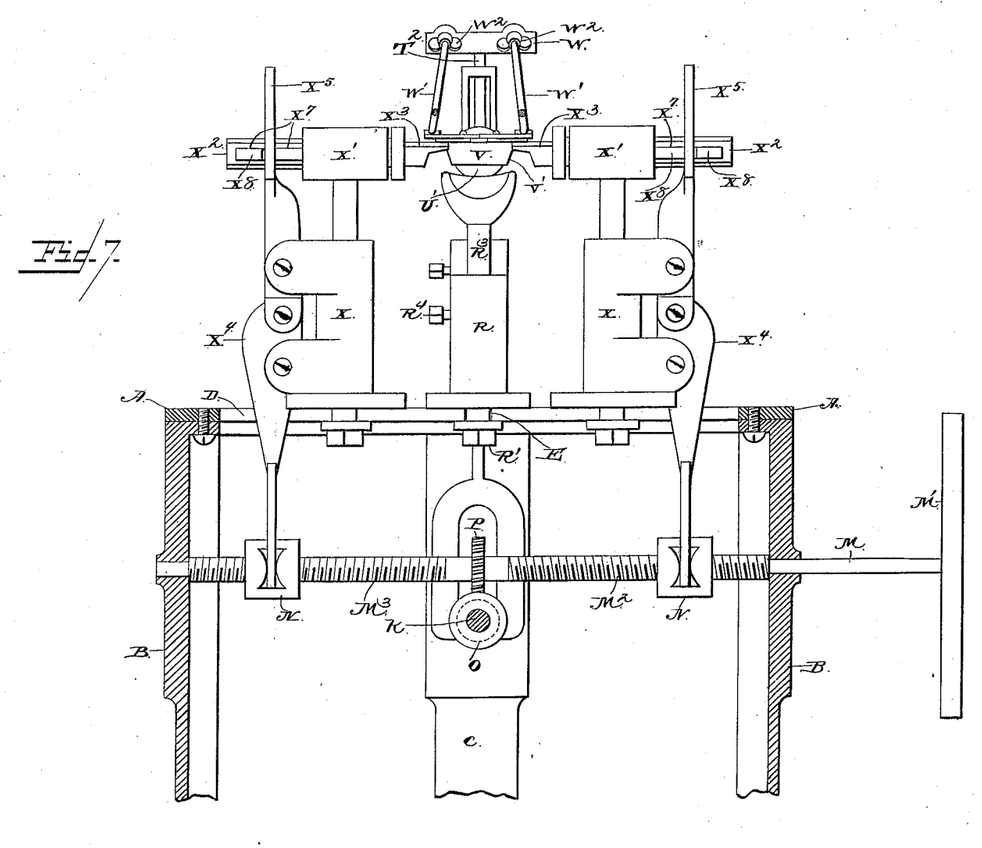
Fig. 7 is a vertical transverse section on line $w\ w$ of Fig. 1.
Figure 8:
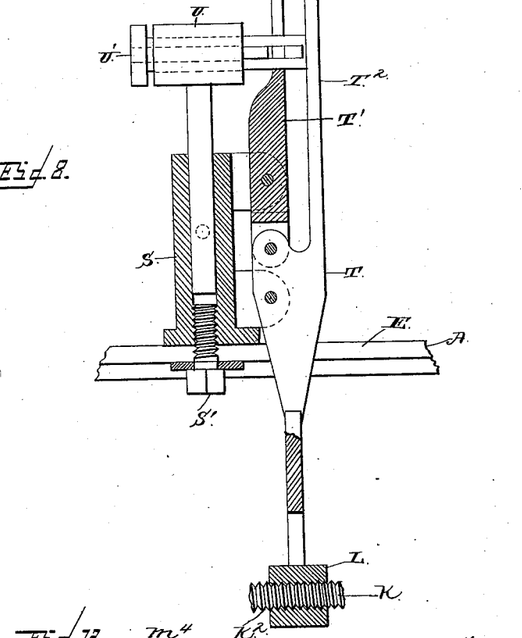
Fig. 8 is a detail sectional view of one of the standards S.
Figure 12:
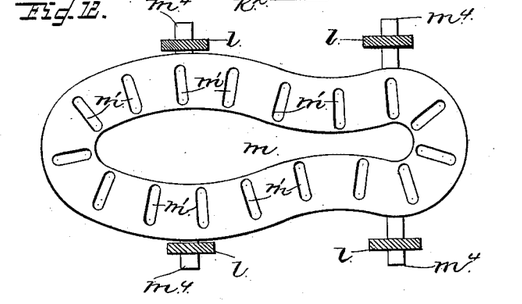
Fig. 12 is a detail view of the templet.

V represents gatherers, which are provided with curved heads V', that are adapted to fit the toe and heel of the last. From the central portion of the heads of these gatherers, on the rear sides thereof, project horizontal spindles $V^2$, which enter the bores of the sleeves and are secured therein by means of set-screws, with which the outer ends of the said sleeves are provided. On the upper side of the head of each gatherer, at the center thereof, is rigidly secured an inwardly-projecting plate, $V^3$, forming a tongue or flange. The said plate is of considerable width, and its inner edge is curved, and thereby adapted to closely fit the center of the heel or toe of the last. The outer edges, $V^9$, of the said plate are inclined inwardly toward the center of the plate, thereby leaving a space between each side of the plate and the contiguous inner ends of the pivoted curved jaws $V^4$, as shown in Fig. 5. The said jaws have their inner sides curved and thereby adapted to the toe or heel of the last, and the under sides of the inner sides of the said jaws and of the projecting plate $V^3$ are beveled, as shown, thereby adapting the said jaws and plate to pass over the bottom or sole of the last, so as to force the upper-leather over the insole on the last, and thus compress it firmly in position and prevent the leather from being wrinkled, and also avoid "shingling." To each of the jaws $V^4$, at the inner end of the same, is attached a plate, $V^5$. The said plates have their outer ends projecting outwardly beyond the jaws, thereby forming arms, in the outer ends of which are made slotted openings $V^6$, for the purpose to be hereinafter described. The inner ends of the plates $V^5$ project over the plate $V^3$, as at $V^7$, and extend to the center thereof, thus effectually closing the spaces between the edges of the said plate $V^3$ and the inner ends of the pivoted jaws, thus preventing the leather from becoming kinked and caught in the cracks between the outer edges of the plate $V^3$ and the inner ends of the pivoted jaws.

In Fig. 5 I have shown the projecting portion $V^7$ of the plates $V^5$ broken away at one side to show the plate $V^3$ below.

To the upper end of each arm $T^2$ of the levers T is connected a vertically-movable transverse cross-head, W.

W' represents rods which have their front ends pivoted in the openings $V^6$ of the arms $V^5$ of the pivoted jaws. The outer ends of the said rods are screw-threaded and extend through transverse openings which are made in the cross-heads, and are provided with thumb-nuts $W^2$, which bear against opposite sides of the cross-heads and are screwed onto the threaded ends of the rods, and are thus adapted to adjust the latter forwardly and rearwardly in the cross-heads.

X represents standards, which are identical in construction with the standards S and are adjustably secured in the slots D. The said standards carry vertically-adjustable heads X', in which are secured longitudinally-movable sleeves $X^2$, carrying plungers $X^3$. In the ears which project outwardly from the standards X are pivoted toggle-jointed levers $X^4$ and $X^5$. The levers $X^4$ have their lower ends attached to the sliding collars on the shafts K, and the upper ends of the levers $X^5$ are connected to the longitudinally-movable sleeves. The said levers $X^5$ have vertical slots $X^6$, to receive the rear ends of the sleeves, and the latter are provided with openings, as at $X^7$, to receive keys $X^8$, which bear against the inner and outer sides of the levers $X^5$.

From the foregoing description it will be readily understood that when either of the shafts K is rotated its motion will be communicated to its transverse connected shaft M by means of the worm-gear previously described, thus causing both the said shafts to rotate at the same rate of speed, so as to force the gatherers against the heel and toe of the last, and also force the plungers against the sides of the last at the bottom thereof simultaneously.

To the under side of the swinging bar G, between the pivotal standard F and the depending standard H, is bolted a depending yoke-guide, Y, the horizontal portion of which and the outer end thereof are provided with a longitudinal slot, Y'. To the inner end of the said guide is fulcrumed a hand-lever, $a$, the outer end of which extends through the slot H of the depending standard H and bears upon the upper end of the coiled extensile spring in the said standard. The function of this spring is to keep the hand-lever $a$ moved normally to the upper end of the slot, so as to raise the holding rod or bar $c$, which is attached to the said hand-lever, from the last. This holding-rod extends downwardly through the slot Y' and through a movable guide-plate, $d$, which is clamped to the horizontal portion of the yoke-guide, and is provided with a depending sleeve, $d'$, which serves to keep the holding-rod always in an exactly vertical position. The hand-lever $a$ is provided with a curved slot, $a'$, through which extends the pin that pivots the holding-rod to the hand-lever, and the function of this slot is to enable the holding-rod to be adjusted by moving the guide-plate $d$ on the guiding-yoke. The lower end of the holding-rod is roughened, so as to cause it to bear firmly upon the insole when it is lowered to the last, and thus prevent the holding-rod from slipping on the last.

$e$ represents a brace-arm which extends from the inner end of the yoke-guide to the pivotal standard F, and the said brace-arm is provided at its lower end with a horizontal foot, $e'$, the inner edge of which is rounded and fits in a groove, $f$, which is formed between two collars, $f'$, that are made with the standard F.

$g$ represents a lever-frame comprising the horizontal bars $g'$ and the connecting-rods or cross-bars $g^2$. The said lever-frame is connected to one end of the bar G above the yoke-guide by means of rocking links $h$, which have their upper ends pivoted to the lever-frame and their lower ends pivoted to the swinging bar. To the pair of the said links, which are located near the outer ends of the swinging bar, are attached handles or levers $h'$, the outer ends of which are connected by a transverse rod, $h^2$.

$i$ represents rocking levers, which are located intermediate between the links $h$, and have their upper ends pivoted to the lever-frame. The said rocking levers, near their lower ends, are fulcrumed to the swinging bar, as at $i'$, and are provided with depending ears $i^2$, having outwardly-projecting spindles $i^3$.

$k$ represents a pair of horizontal yoke-bars, which are provided near their outer ends with depending ears $k'$ and with horizontal slots $k^2$, through which the spindles $i^3$ of the rocking lever-arms extend, thereby suspending the said yoke-bars from the said rocking lever-arms. From the center of each yoke-bar projects an upwardly-extending tongue or arm, $k^3$, having a vertical slot, $k^4$. Bolts $k^5$ extend through the said slots and enter the swinging bar G, and thus serve to prevent the yoke-bars from moving longitudinally, but allow them to be freely moved in a vertical direction when the arms $i$ are rocked by raising or lowering the lever-frame $g$.

$l$ represents a series of depending rods or links, which have their upper ends pivoted to the depending ears $k'$ of the yoke-bars. In the lower end of each of the said rods or links is made a transverse opening, $l'$.

$m$ represents the templet, which is of the general shape of the bottom of the last Z, and is provided with slots $m'$ around its edge for the engagement of hooks $m^2$, from which are suspended clamps $m^3$. The said templet, hooks, and clamps are of the same construction as described in the Letters Patent of the United States No. 236,218 and No. 247,625, granted to me January 4, 1881, and September 27, 1881, respectively, with the exception that the templet is provided near the toe and heel with outwardly-extending spindles $m^4$, which pass through the openings $l'$ of the links or rods $l$.

From this construction it will be readily understood that the templet is suspended from its outer sides at both ends, and not from the center, as heretofore, and thus the templet is always maintained in an exactly horizontal position and is prevented from being tilted or inclined to one side, in the event that the leather in undergoing the operation of being stretched onto the last should have one side more spongy or elastic than the other. It will thus be seen that the leather will be stretched with equal tension all around the edges of the last, and thus prevent an imperfectly-lasted shoe from being produced by the machine.

Figure 1:
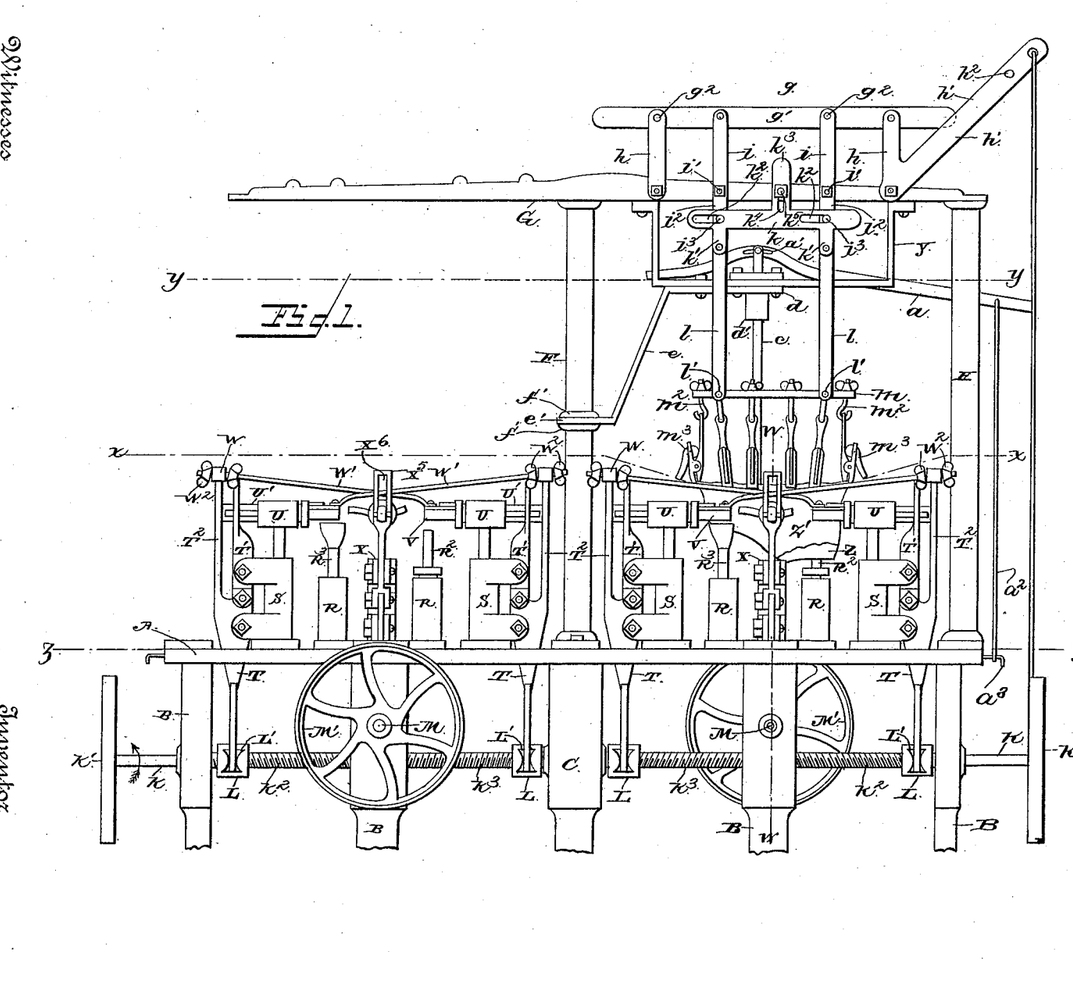
Figure 1 is a side elevation of a lasting-machine embodying my improvements.
Figure 2:
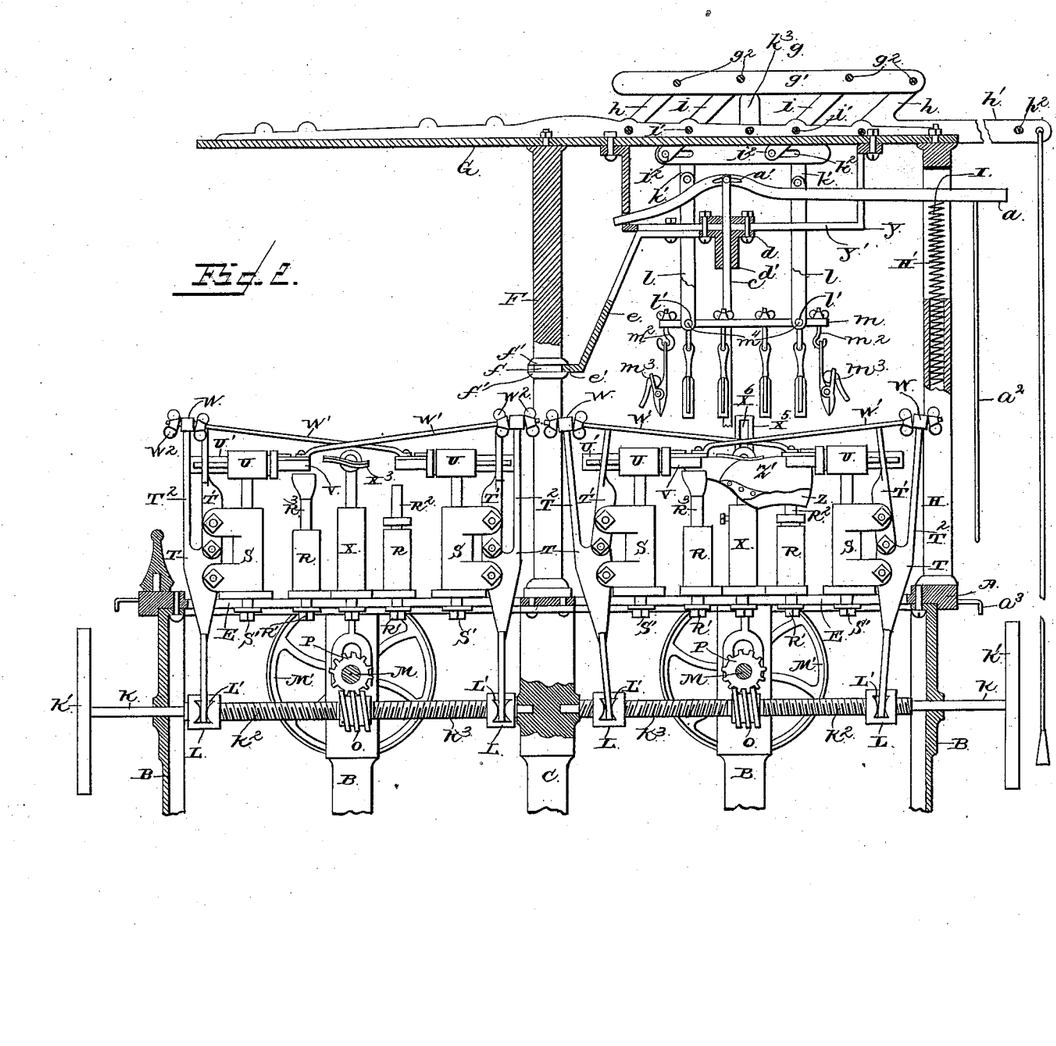
Figure 3:
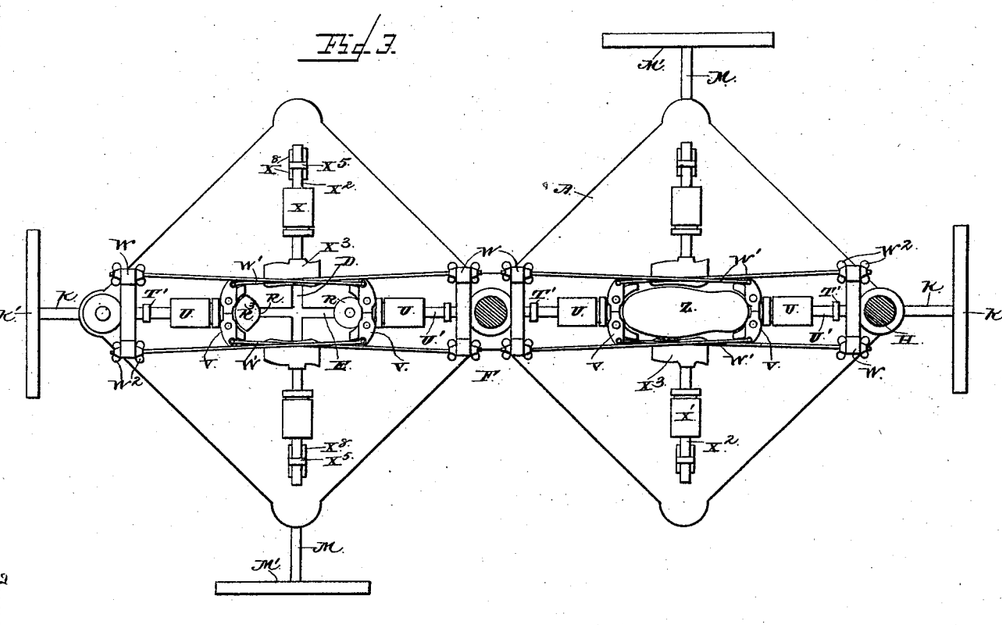
Fig. 3 is a horizontal section taken on the line $x\ x$ of Fig. 1.
Figure 4:
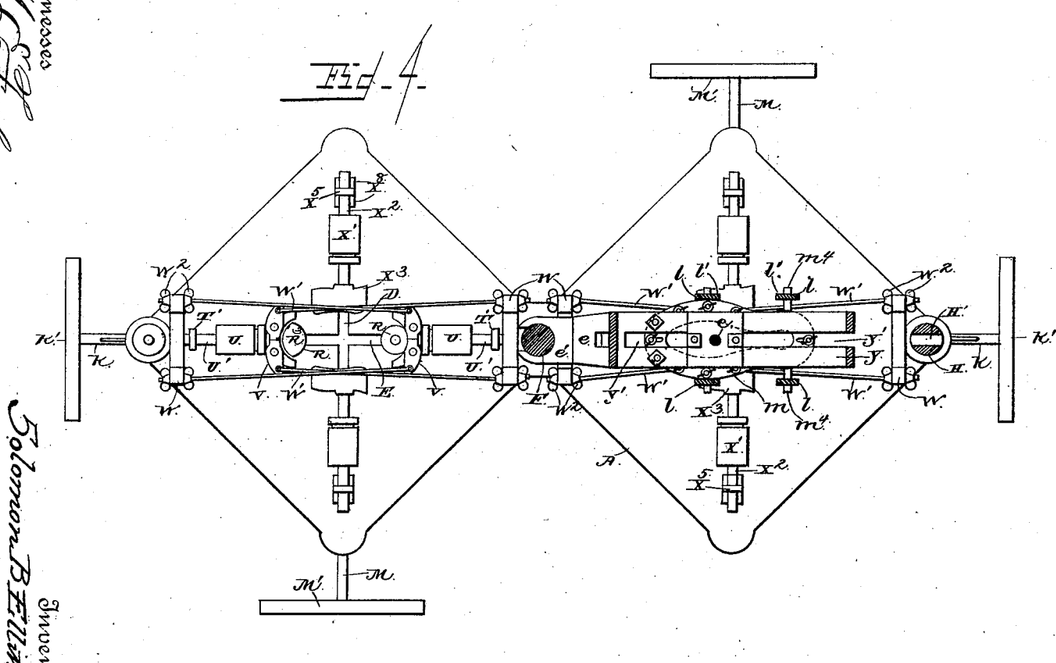
Fig. 4 is a similar view taken on the line $y\ y$ of Fig. 1.

The operation of my invention is as follows: In order to last a boot or shoe on this machine, I first take an insole and tack it on the bottom of the last. I then take the upper-leather Z' for the boot or shoe that has been prepared for lasting and turn it bottom up and insert the last Z therein. The bar G is then swung around on the standard F, so as to move the templet and the holding-rod out of the way, and the last is secured in an inverted position upon its supports. The swinging bar G is then moved back to its initial position, so as to bring the templet and the holding-rod over the last, and the lever-frame is raised, thereby causing the templet to be lowered. The clamps $m^3$ are then caused to grasp the upper-leather Z' all around the edge thereof where it projects above the sole of the last, first grasping at the center of the heel, then at the center of the toe, and then at proper distances apart all around the said leather or upper. The hand-lever $a$ is then lowered against the resistance of its spring, so as to cause the holding-rod to bear upon the last, and the hand-lever is secured in this position by means of a depending hook-rod, $a^2$, which engages a catch, $a^3$, on the end of the table or bed. The lever-frame is then raised, causing the clamps to be drawn upwardly by the templet, thereby causing the clamps to pull the leather Z' closely to the last at every point alike. The holding-bar prevents the last from being raised with the leather, thus causing the latter to be effectually stretched and fitted on the last. One of the shafts K is then rotated in the direction indicated by the arrow in Fig. 1, causing its sliding collars to be moved toward each other by the right and left hand screw-threads, and thus causing the toggle-jointed levers to engage with the said collars to move the gatherers against the heel and toe of the last. As the shaft K is geared to its transverse shaft M, as before described, the latter is also caused to rotate in the direction indicated by the arrow in Fig. 1, and the right and left hand screw-threads on the said shaft M cause its collars to be moved toward each other, thereby forcing the plungers against the sides of the last at the same time that the gatherers are forced against the heel and toe thereof. This causes the upper-leather Z' to be pressed to the shape of the last all around the bottom thereof and over the insole which has been tacked thereon. The leather is thus effectually lasted, and, if desired, the edges which are bent over the bottom of the insole may be temporarily secured thereto by driving pegs or nails through the openings which are made in the plungers. As soon as the leather has been set to the last, the plungers and gatherers are caused to move outwardly from the last by reversing the rotation of the shaft K, the clamps are disengaged from the leather, the holding bar or rod is released from the last, and the latter is then removed. During the time consumed in lasting a shoe on one end of the machine another last and leather are placed upon the opposite end of the machine, so that as soon as one shoe is lasted the bar G is swung around to the opposite end of the machine, and the operation before described is then repeated.

By thus making the machine double-ended and providing it with two sets of gatherers and plungers, and with two independent mechanisms for operating the same, and by providing the swinging bar carrying the stretching and holding mechanism, the capacity of the machine is very greatly increased, thus effecting a great economy in the process of lasting the boots or shoes.

The function of the slots V⁶ in the arms of the pivoted jaws of the gatherers, and in which the connecting-rods W' are pivoted, is to allow a slight play to the said rods in the slots, in order to time the operation of the gatherers on different sizes of shoes, and the cross-heads W, to which the outer ends of the rods W' are attached, are made vertically movable on the levers-arms T², for the same purpose.

The plungers, which are adapted to fit the spring of the last between the toe and the heel, have their inwardly-projecting flanges beveled on their under sides similarly to the jaws and plates of the gatherers, so as to enable the said projecting flanges to pass over the bottom or sole of the last, to force the upper-leather, between the toe and heel, over the insole on the last, and compress it firmly in position without wrinkling.

The plungers X³ are shown clearly in Figs. 10 and 11 with their wedge-shaped or beveled flanges. These flanges serve to wedge or crowd the leather over the spring of the last.

Having thus described my invention, I claim—

1. The combination, in a lasting-machine, of the stationary bed or table having the duplicate set of clamping devices and supports for the lasts, with the swinging arm G, pivoted midway between the duplicate supports for the lasts and carrying at one end the stretching and holding devices, substantially as described.

2. The combination, in a lasting-machine, of the bed or table having the clamping devices and the supports for the lasts at opposite ends, with the swinging bar G, pivoted above the table or bed and having the stretching devices, and the hand-lever $a$, with the holding-rod $c$, substantially as described.

3. The combination, in a lasting-machine, of the supporting-bar G, the rocking levers $i$, pivoted thereto and connected together, the yokes $k$, suspended from the said levers, and the templet provided with a series of pinchers and having its sides suspended from the said yoke, whereby the templet is maintained at all times in a horizontal position, substantially as described.

4. The combination, in a lasting-machine, of the supporting-bar G, the rocking levers $i$, pivoted thereto, the vertically movable yoke-bars $k$, attached to the levers $i$, the links or rods $l$, depending from the ends of the yoke-bars, and the templet provided with a series of pinchers and suspended by the said links or bars $l$, for the purpose set forth, substantially as described.

5. The combination, in a lasting-machine, of the supporting-bar G, the rocking levers $i$, pivoted thereto and having the pins or spindles $i^3$ extending from their lower ends, the vertically-movable yoke-bars $k$, having the slots $k^2$, with which the said pins or spindles $i^3$ engage, the rods or links $l$, having their upper ends pivoted to the yoke-bars and suspended therefrom, and the templet provided with a series of pinchers and attached to the lower ends of the said links or bars, substantially as described.

6. The combination, in a lasting-machine, of the supporting-bar G, the lever-frame $g$, the rocking levers $i$, pivoted to the bar G and attached to the lever-frame $g$, the vertically-movable yoke-bars $k$, attached to the levers $i$ and movable thereby, and the templet provided with a series of pinchers and suspended at its sides from the said yoke-bars, substantially as described.

7. In a lasting-machine, the combination, with the lever $a$, of the last, the holding-bar pivoted to the lever and adapted to rest upon the last, the pivot of the holding-bar to the lever being capable of horizontal adjustment, and a guide to retain the holding-bar in a vertical position, said guide being adjustable laterally to effect the horizontal adjustment of the pivot-point of the holding-bar, as set forth.

8. In a lasting-machine, the combination, with the last, of the hand-lever $a$, having the slot $a'$, and the holding-bar pivoted in the said slot, whereby the holding-bar may be adjusted laterally, and means, substantially as described, for holding the hand-lever down, as set forth.

9. The combination, in a lasting-machine, of the supporting-bar G, having the depending guide-yoke Y, the plate $d$, movable on the said guide-yoke, the holding-rod extending through the said plate and guided thereby, the hand-lever to which the said holding-rod is attached, and the pinchers for grasping the upper, substantially as described.

10. The combination, in a lasting-machine, of the bed or table having the clamping devices at opposite ends and the supports for the lasts, with the swinging bar G, pivoted above the center of the table and carrying the stretching and holding devices, and the standard H, suspended from the outer end of the said swinging bar and adapted to rest upon either end of the bed or table, for the purpose set forth, substantially as described.

11. The combination, in a lasting-machine, of the supporting-bar G, the templet suspended therefrom by mechanism, substantially as described, and vertically movable thereon, the hand-lever $a$, fulcrumed below the supporting-bar, the holding-rod attached to the said hand-lever, the spring to normally raise the hand-lever and the holding-rod, and the hook or catch to lock the said lever when lowered, for the purpose set forth, substantially as described.

12. The combination, in a lasting-machine, with the gatherers and plungers for acting upon the heel and toe and sides of the last, respectively, of the operating-shafts having the right and left hand screw-threads, the toggle-jointed levers connected to the gatherers and plungers for operating the same simultaneously, and the threaded collars working on the threaded shafts and engaging the toggle-jointed levers, substantially as described.

13. The gatherer having the head $V'$, the central plate, $V^3$, and the pivoted jaws $V^4$ on opposite sides of the said plate and having the projecting plates $V^7$ on their inner sides to extend over the plate $V^3$, for the purpose set forth, substantially as described.

14. The gatherer having the curved head provided with the central plate, $V^3$, and the pivoted jaws $V^4$, having the plates $V^7$, the inner ends of the said plates projecting over the plate $V^3$ and adapted to meet at the center thereof, and the outer ends of the said plates forming projecting arms $V^5$, for the purpose set forth, substantially as described.

15. The gatherer having the central plate, $V^3$, and the pivoted jaws $V^4$, the inner edges of the said plate and jaws being beveled on their under sides and adapted to fit the toe or heel of the last, for the purpose set forth, substantially as described.

In testimony that I claim the foregoing as my own I have hereto affixed my signature in presence of two witnesses.

SOLOMON B. ELLITHORP.

Witnesses:
JOHN H. SIGGERS.
WM. N. MOORE.